US006133908A

United States Patent [19]
Scibora et al.

[11] Patent Number: 6,133,908

[45] Date of Patent: Oct. 17, 2000

[54] MULTI-STATION VIDEO/AUDIO DISTRIBUTION APPARATUS

[75] Inventors: Marco Scibora, St. Paul; Warren Kahle, Woodbury, both of Minn.

[73] Assignee: Advanced Communication Design, Inc., Bloomington, Minn.

[21] Appl. No.: 08/859,882

[22] Filed: May 21, 1997

Related U.S. Application Data

[63] Continuation-in-part of application No. 08/760,640, Dec. 4, 1996.

[51] Int. Cl.[7] .............................. H04N 7/00; H04N 7/10; H04H 9/00; H04H 1/00

[52] U.S. Cl. ................................ 345/327; 348/7; 348/10; 348/12; 348/13; 348/1; 455/5.1; 455/4.2; 455/6.1

[58] Field of Search ................................ 345/327; 348/7, 348/10, 12, 13, 1, 2; 455/2, 3.1, 4.2, 6.1, 6.2, 6.3, 5.1; H04N 7/00, 7/10, 7/14; H04H 9/00, 1/00, 1/14

[56] References Cited

U.S. PATENT DOCUMENTS

| | | |
|---|---|---|
| 4,279,185 | 7/1981 | Alonso . |
| 4,839,505 | 6/1989 | Bradt et al. . |

(List continued on next page.)

FOREIGN PATENT DOCUMENTS

| | | |
|---|---|---|
| 0505304A2 | 9/1992 | European Pat. Off. . |
| 0711073A2 | 5/1996 | European Pat. Off. . |
| 817139A2 | 1/1998 | European Pat. Off. . |
| 2063541 | 6/1981 | United Kingdom . |
| WO 94/15416 | 7/1994 | WIPO . |
| WO95/30212 | 11/1995 | WIPO . |

OTHER PUBLICATIONS

Advanced Communication Design, Inc., "Home of the STAR Series of Products for Commercial Previewing", Advanced Communication Design, Inc. Home Page, pp. 1–2, XP 002069601.

(List continued on next page.)

*Primary Examiner*—Nathan Flynn
*Assistant Examiner*—Vivek Srivastava
*Attorney, Agent, or Firm*—Rider Bennett Egan & Arundel

[57] ABSTRACT

A multi-station video/audio distribution apparatus having at least two preview stations, a data control mechanism, a preview station interface mechanism disposed between the preview stations and the data control mechanism, and a video display interface mechanism disposed between the preview stations and the data control mechanism. Each of the preview stations has a user input in the form of a bar code scanner to enter a video material selection, an audio output and a video display. The data control mechanism retrieves digitized video and audio material corresponding to each of the user's video material selections. The preview station interface mechanism transfers the user's inputs from each of the preview stations to the data control mechanism, receives the digitized audio materials corresponding to each user's input from the data control mechanism, converts the digital audio materials to analog audio signals and transfers the analog audio signals to each of the respective preview stations for the audio output. The video display interface mechanism receives the digitized video material corresponding to each user's input from the data control mechanism, converts the digital video material to a format acceptable to the video display and transfers the formatted video material to the video display.

25 Claims, 2 Drawing Sheets

U.S. PATENT DOCUMENTS

| | | | |
|---|---|---|---|
| 4,924,303 | 5/1990 | Brandon et al. . | |
| 5,237,157 | 8/1993 | Kaplan | 235/375 |
| 5,262,875 | 11/1993 | Mincer et al. | 346/6 |
| 5,329,572 | 7/1994 | Martens . | |
| 5,418,713 | 5/1995 | Allen | 705/32 |
| 5,481,478 | 1/1996 | Palmieri et al. . | |
| 5,497,502 | 3/1996 | Castille . | |
| 5,515,347 | 5/1996 | Mulder et al. . | |
| 5,546,324 | 8/1996 | Palmer et al. . | |
| 5,548,281 | 8/1996 | Funahashi et al. . | |
| 5,555,098 | 9/1996 | Parulski . | |
| 5,596,647 | 1/1997 | Wakai et al. . | |
| 5,625,404 | 4/1997 | Grady et al. . | |
| 5,629,867 | 5/1997 | Goldman . | |
| 5,631,745 | 5/1997 | Wong et al. . | |
| 5,633,839 | 5/1997 | Alexander . | |
| 5,668,788 | 9/1997 | Allison . | |
| 5,689,481 | 11/1997 | Tamura . | |
| 5,691,964 | 11/1997 | Niederlein . | |
| 5,784,558 | 7/1998 | Emerson . | |
| 5,838,383 | 11/1998 | Chimoto et al. | 348/10 |

OTHER PUBLICATIONS

Scibora, Marco, "NCR, Advanced Communication Design may offer video/sound system", Apr. 20, 1993, pp. 1–2, XP002069600.

Advanced Communication Design, "NCR, Advanced Communication Design may offer video/sound system", Apr. 20, 1993, XP–002069600 (This system is comprised of multiple computers networked together (LAN). The network is "LANTASTIC" by Artisoft).

Advanced Communication Design, Inc., "Look The Future is Now at Advanced Communication Design, Inc.", XP–002069601 (This system is comprised of multiple computers networked together (LAN). The network is "LANTASTIC" by Artisoft).

MULTI-STATION VIDEO/AUDIO DISTRIBUTION APPARATUS

This application is a continuation-in-part of the application entitled "Multi-Station Audio Distribution Apparatus" filed on Dec. 4, 1996, U.S. Ser. No. 08/760, 640.

BACKGROUND

This invention relates to a video and audio sampling device and more particularly to a multi-station video/audio distribution apparatus for sampling video/audio material such as video tapes and laser discs.

Few, if any, retail video stores or rental video stores offer actual video sampling to the user. As such, a video consumer is left to rely on those films they have seen in theaters or on television as reference in their purchasing decision. However, a large number of video consumers do not go to the theater to watch films, e.g. parents who have small children at home or those who simply cannot afford to go to the theater. These consumers are left to rely strictly on television for reference in a video purchasing decision. The problem is that only select films are shown on television further, many films are released straight to video and thus, are never shown on television or in the theater. Moreover, there is often quite a lag between the time a film is released on video and shown on television. The result is that the video consumer is left with no reference and no guidance in deciding what films are appropriate to purchase for themselves, family and friends.

Most retail and rental video stores do have a video playing while the consumer is in the store. However, this video is selected by store management and not by the consumers themselves. Further, a single video can take up two to three hours to play allowing the consumer to sample view only a single video. Additionally, the video selected is usually in the main stream of pop culture leaving those consumers that are interested in foreign films, documentaries, and older films with no reference at all.

The same is true of retail music stores. Few retail music stores allow test sampling of the compact disks and/or cassettes that they sell. Thus, a music consumer is left to rely on the radio stations to first hear what may be contained on a compact disk. Radio stations, however, generally play only one selection from a compact disk that may contain ten or more musical selections. The result is that a musical consumer buys a compact disk based on the one selection they have heard only to be disappointed by the additional selections which are not equivalent in quality or are not to the liking of the consumer. After repeated occurrences of the aforedescribed situation, the disappointed consumer will inevitably meet a level of frustration at which point they will buy only a compact disk containing a single selection, at much lower cost than the album compact disk, or will stop buying compact disks altogether. In either situation, the profits of the retail music store are reduced.

Those retail music stores that do allow test sampling, do so by actually opening a compact disk or cassette and inserting the cassette or disk into the player for the consumer to hear. Generally, the store is limited to one or two players and the retail store will only open those disks which it believes will be popular and will sell. The limitations are thus apparent, a retail music store may be full of customers yet only one or two may listen to a musical sample. Further, those consumers that are interested in non-mainstream music are left in the cold with no opportunity to sample their preferred music.

Based on the foregoing, there is a need for an apparatus that will allow a number of consumers to simultaneously view samples of different videos in various areas of interest and/or will allow a number of consumers to simultaneously listen to different types of disks of all types of music.

SUMMARY

A multi-station video/audio distribution apparatus having at least two preview stations, a data control mechanism, a preview station interface mechanism disposed between the preview stations and the data control mechanism, and a video display interface mechanism disposed between the preview stations and the data control mechanism. Each of the preview stations has a user input in the form of a bar code scanner to enter a video material selection, an audio output and a video display. The data control mechanism retrieves digitized video and audio material corresponding to each of the user's video material selections. The preview station interface mechanism transfers the user's inputs from each of the preview stations to the data control mechanism, receives the digitized audio materials corresponding to each user's input from the data control mechanism, converts the digital audio materials to analog audio signals and transfers the analog audio signals to each of the respective preview stations for the audio output. The video display interface mechanism receives the digitized video material corresponding to each user's input from the data control mechanism, converts the digital video material to a format acceptable to the video display and transfers the formatted video material to the video display.

An object and advantage of the present invention is that the multi-station video/audio distribution apparatus may utilize multiple preview stations that are controlled by a single data control means.

Another object and advantage of the present invention is that bar code scanning may be used to select the desired video material.

Another object and advantage of the present invention is that random access to video and/or audio material is provided at any and all of the preview stations.

Yet another object and advantage of the present invention is that data related to the selected video material may be displayed at each preview station. As well, apparatus adjustments such as fast forward play, fast backward play and volume control may also be provided at each preview station.

Still another object and advantage of the present invention is that low voltage wiring is used to connect each preview station to the preview station interface means.

Another object and advantage of the present invention is that the multi-station video/audio distribution apparatus provides scalable architecture that can grow from a small to a massive apparatus.

Another object and advantage of the present invention is that the multi-station video/audio distribution apparatus may be used solely to sample audio tracks such as from a compact disk/cassette or video disk/cassette or alternatively, may make use of a video display to sample video material alone or in combination with audio material.

DETAILED DESCRIPTION

The multi-station video/audio distribution apparatus 10 may take two forms. The first form is that of audio distribution alone, depicted in FIGS. 1 and 2. The second form is that of an audio and video distribution depicted in FIGS. 3 and 4.

Figures 1, 2:
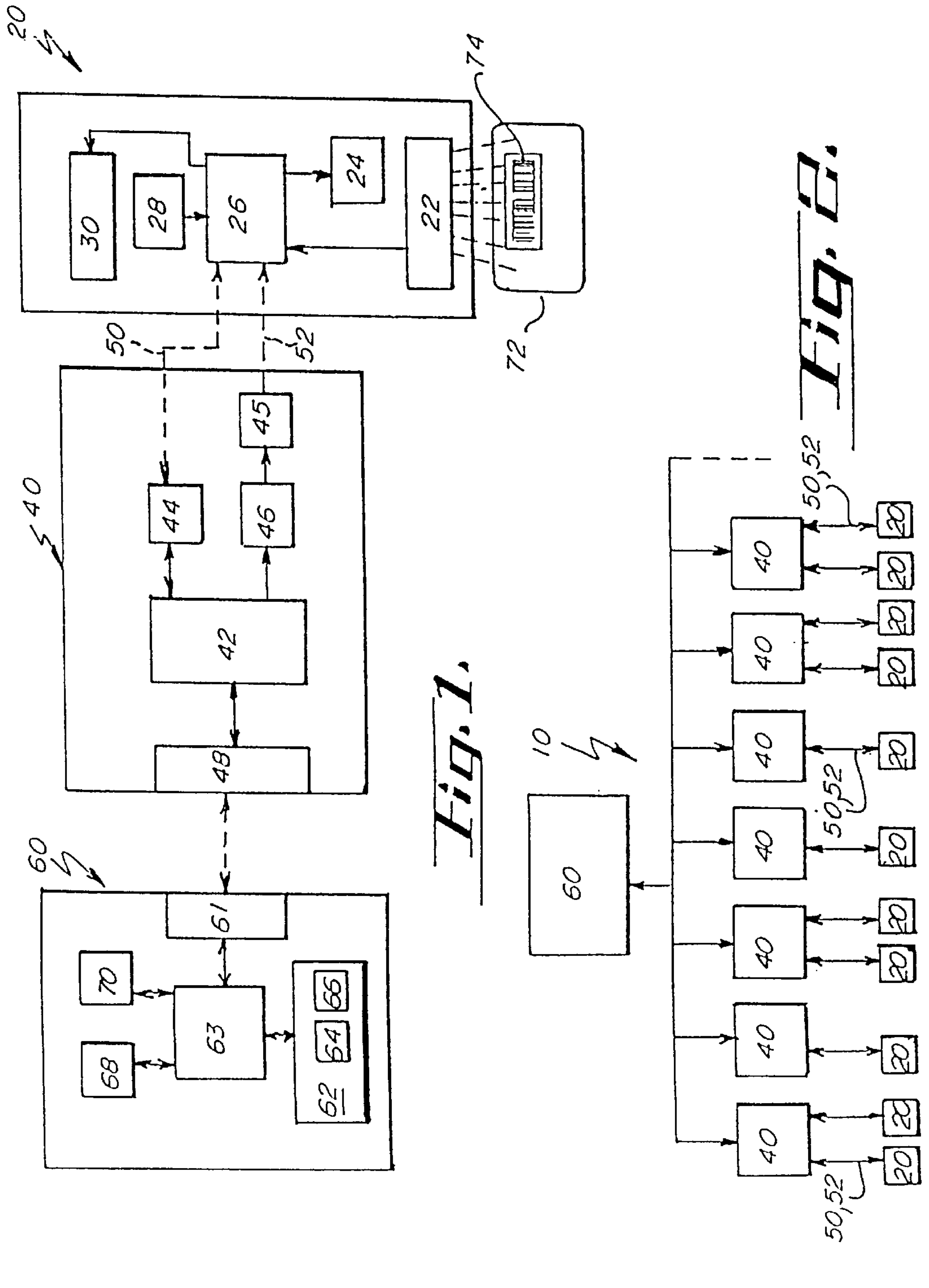
FIG. 1 depicts components of one preview station, one preview station interface means and the data control means of the present invention.
FIG. 2 depicts the layout of the present invention with its single data control means and multiple preview stations and preview station interface means.

In its first form see FIGS. 1 and 2, the multi-station video/audio distribution apparatus 10 generally comprises three component parts, a preview station 20, a preview station interface means 40 and a data control means 60.

The layout of the preview station 20 is shown in FIG. 1. The preview station 20 at a basic level incorporates a user input in the form of a bar code scanner 22, an audio output 24, which may be a speaker and/or a standard stereo phono jack attached to headphones, and a software controlled microcontroller 26. The bar code scanner 22 and audio output 24 are tied to the microcontroller 26 which handles the transfer of all inputs into the preview station 20 and all outputs out of the preview station 20. The preview station 20 may further incorporate a keypad 28 and a visual display 30 such as a liquid crystal display. The keypad 28 can be used to input apparatus adjustments such as volume control, audio track selection and speed of playback. Further, the keypad 28 may be enabled for other input functions such as "help," "price," "additional information," "similar music," and "interview with artist or author." The visual display 30 can be used to display informational data relating to selected audio material such as the title of a track, name of the artist or author, price, label, genre, media, etc. As with the bar code scanner 22 and audio output 24, the keypad 28 and visual display 30 are tied to the software controlled microcontroller 26 to handle inputs to and outputs from the preview station 20.

The preview station interface means 40 is also shown in FIG. 1. Depending on hardware configuration the preview station interface means 40 may be adapted to accommodate one or two preview stations 20. Each preview station interface means 40 is generally in the form of a circuit board powered by low voltage direct current. Contained within the circuit board is a microcontroller 42 under program control having random access memory and read only memory, a digital interface 44, an analog interface 45, a digital-to-analog converter 46 and a data control means interface 48. The digital interface 44 is tied to the microcontroller 42 and is connected to the preview station 20 via a low voltage digital interface cable 50. The digital to analog converter 46 is also tied to the microcontroller 42 and is connected to the preview station 20 through the analog interface 45 via a low voltage analog interface cable 52. The microcontroller 42 is connected to the data control means 60 via the data control means interface 48. The microcontroller 42 serves as the data and audio signal transfer mechanism between the data control means 60 and the preview station 20.

The data control means 60, see FIG. 1, comprises a standard computer platform that incorporates a power supply, a backplane/bus 61 that is connectable to the data control means interface 48 of the preview station interface means 40, a microprocessor 63, random access memory, and interfaces to various peripherals such as disk drives that operate in conjunction with disk controllers, modems, video displays, keyboards, and tape backup units. The data control means 60, or computer platform, utilizes operating system software 62 (e.g. UNIX) that has low level device drivers 64, file management utilities 66 and further utilizes application software 68 that operates within the computer platform to implement the full functionality of the apparatus 10. The computer platform also incorporates high-speed random access storage of audio and/or video material in digital form; the audio and/or video material is contained in data files stored on internal or external hard drives 70 that are connected to interfaces within the computer platform. The data control means 60 is connected to the preview station interface means 40 via the data control means interface 48 which is a computer bus.

The layout of the multi-station video/audio distribution apparatus 10 is shown in FIG. 2, its operation as applied to a retail music store is preferably described as follows. A user selects a music CD (compact disk) 72 from among those offered for sale. The user takes the CD 72 to a nearby preview station 20 puts on the attached headphones and passes the bar code 74 that is imprinted on the CD label under the bar code scanner 22.

The bar code scanner 22 transmits the bar code 74 through a serial data connection to the software controlled microcontroller 26 contained within the preview station 20. This data is received by the microcontroller 26 and temporarily stored in RAM under program control. The program packetizes the data and re-transmits it to the preview station interface means 40 through the digital interface cable 50, which is a 6-conductor modular cable. The data packet is received, after passing through the digital interface 44, as a serial bit stream by the preview station interface means microcontroller 42 and temporarily stored in RAM under the microcontroller's (42) program control.

The microcontroller (42) program waits for a request from a device driver 64 within the data control means 60 before sending the bar code data back through the data control means bus interface 48 to the data control means 60. The device driver 64 polls each preview station interface means 40 approximately every 500 microseconds to exchange data, using an I/O (input/output) address within the data control means 60. The device driver 64 passes the bar code data to the application software 68 running on the data control means 60. The application software 68 then performs a database search against an index of all such bar codes contained within the data control means 60. This database and its index are created before the application software 68 is executed.

Assuming a match is found in the index, the corresponding database record is retrieved from a master file on the hard drive 70. This record contains informational data items relating to the CD 72 selected by the customer, such as artist, title, label, genre, media, bar code, price and file name. These informational data items are transmitted back to the preview station 20 through the chain described above (i.e., from the data control means 60 to the preview station interface means 40 via the data control means interface 48, then to the preview station 20 via the digital interface 44 and the digital interface cable 50). The informational data items can be displayed on the visual display for review by the user.

The file name retrieved from the database record is then used by the data control means 60 to access the audio material stored in digital form as a file on the hard drive 70.

This function is performed by the operating system software 62 under the direction of the application software 68. Blocks of data are read from the hard drive 70, passed through a disk controller and temporarily buffered in RAM (random access memory). The application software 68 processes a "header" portion of the file which consists of approximately one kilobyte of data; the bytes of data include duplicates of fields contained in the master database as well as the compression method used to encode the audio material. The application software 68 then strips the header from the file and instructs the device driver 64 to send the remainder of the file to the preview station interface means 40, one "word" (i.e., 16 bits) at a time. This file of audio material can be mono or stereo and can be encoded as linear, uLaw, ADPCM or other algorithms at various digitization rates.

The microcontroller 42 within the preview station interface means 40 stores each word of the audio material in a FIFO (first in, first out) buffer, reporting the buffer status (full, half-empty, empty) back to the device driver 64 as needed to retrieve further audio material. The program directing operation of the microcontroller 42 empties the buffer by sending bytes of the audio material to the digital-to-analog converter 46, which translates the encoded bytes into an analog stereo signal. This analog stereo signal is amplified within the preview station interface means 40 before being sent to the preview station 20 through the analog interface 45 and the analog interface cable 52, which is a 8-conductor modular cable that is separate and distinct from the digital interface cable 50 described previously. The amplitude of the analog stereo signal is controlled by the preview station interface means circuitry. The analog stereo signal received by the preview station 20 is passed directly to the audio output 24 which may be a speaker or a phono jack attached to headphones. The user hears the analog stereo signal from the selected CD 72 approximately a second or two after scanning the bar code 74.

A sample of three or more tracks from the CD 72 are typically stored on hard drive(s) in digital form. The visual display 30 may show the track number that is currently playing, as determined by the application software 68. The user may push a button on the keypad 28 at the preview station 20 to hear the next track or a previous track from the same CD 72. In addition, the user may press a "volume up" or "volume down" button on the keypad 28 to adjust the volume of the analog stereo signal. These keypad 28 depressions are read by the software controlled microcontroller 26 within the preview station 20 and are passed to the preview station interface means 40, to the device driver 64 and to the application software 68 for interpretation, action and responsive outputs consistent with apparatus adjustment keypad inputs. Other keypad buttons can be enabled for functions such as "help," "price," "additional information," "similar music," and "interview with artist."

The customer merely has to scan another CD 72 to start the process over again. With the potential for many preview stations 20 in a single store location, the apparatus 10 depends on very high-speed processors and data storage.

While the above describes a retail music store application, the same might be applied to a book store or even a library to sample books on CD or tape.

Figure 3:
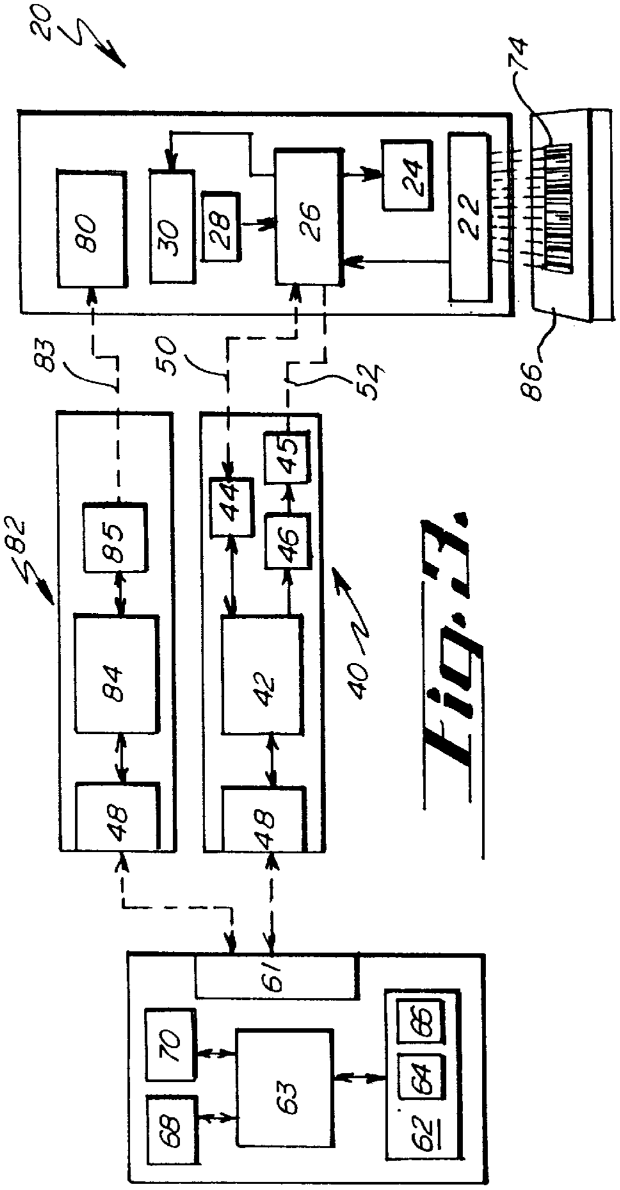
FIG. 3 depicts components of one preview station which additionally incorporates a video display, one preview station interface means, one video display interface means, and the data control means of the present invention.
Figure 4:
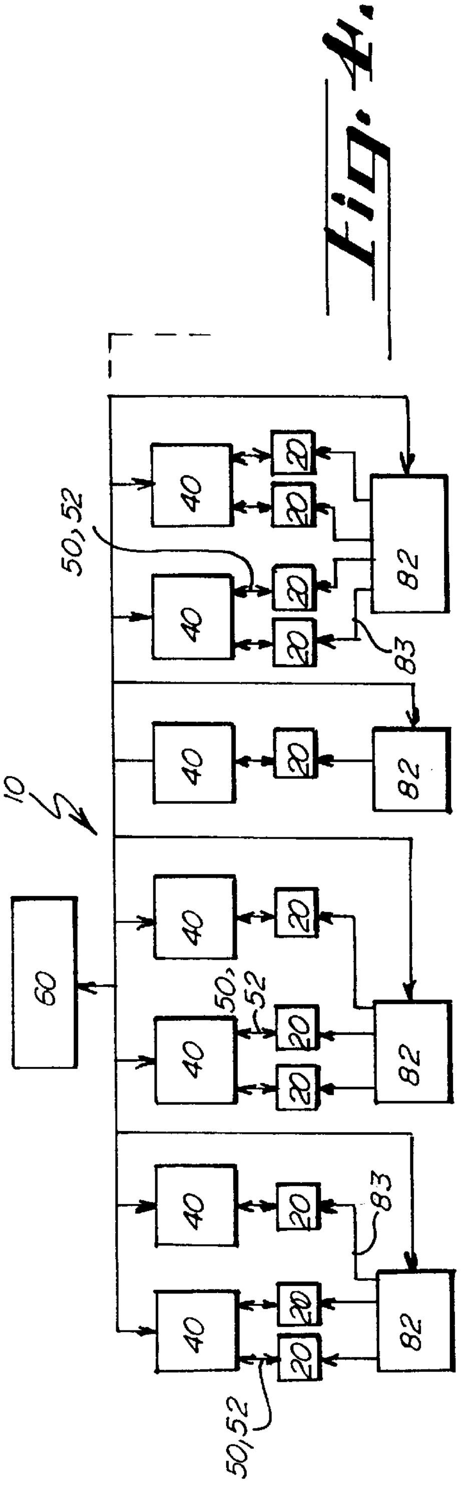
FIG. 4 depicts the layout of the present invention with its single data control means connected to multiple preview station interface means and to multiple video display interface means which in turn are connected to preview stations.

The second form of the multi-station video/audio distribution apparatus 10, shown in FIGS. 3 and 4, incorporates a video display 80, such as a television or monitor, at nearby or within the preview station 20. The video display 80 does not transfer data or information through the preview station microcontroller 26 but rather is directly connected to a video display interface means 82 through a high gauge wire 83 having RC connectors at either end. The video display interface means 82 is generally in the form of a circuit board powered by low voltage direct current and has four ports each of which is capable of supporting a single video display 80. Contained within the video display interface means 82 is a microcontroller 84 under program control having random access memory, read only memory and an analog-to-digital type converter 85 such as an MPEG. The microcontroller's 84 main purpose is that of a type of digital-to-analog converter; it converts a digital video signal to a format that can be read by a video display 80 (television). However, the microcontroller 84 also receives digitized video material from the data control means 60 and transfers formatted video material to the video display 80. The video display interface means 82 is connected to the data control means 60 via computer bus, which is another data control means interface 48.

To accommodate the video display 80, the preview station 20 should be slightly modified. For instance, the keypad 28 configuration should be modified to incorporate a fast-forward play and fast-backward play buttons. Additionally, the keypad 28 might be formatted such that the user is given a selection of buttons, numbered for instance from 1–12, where each button corresponds to a different video selection or the keypad 28 might be formatted such that the user could type in a previously assigned video identification number to retrieve a video sample. As with the other keypad entries of the preview station, these entries would be sent to the preview station's software controlled microcontroller 26 which handles the inputs to and outputs from the preview station 20. All other operation of the preview station's inputs and outputs remains the same.

Operation of the multi-station audio distribution apparatus with the video display is almost identical to operation without the video display. However, here, the user takes a video cassette 86 or video disk to a nearby preview station 20 and passes the bar code 74 that is imprinted on the video's box under the bar code scanner 22.

The bar code scanner 22 transmits the bar code 74 through a serial data connection to the software-controlled microcontroller 26 contained within the preview station 20. This data is received by the microcontroller 26 and is temporarily stored in RAM under program control. The program packetizes the data and re-transmits it to the preview station interface means 40 through the digital interface cable 50, which is a 6-conductor modular cable. The data packet is received, after passing through the digital interface 44, as a serial bit stream by the preview station interface means microcontroller 42 and temporarily stored in RAM under the microcontroller's (42) program control.

The microcontroller (42) program waits for a request from a device driver 64 within the data control means 60 before sending the bar code data back through the data control means bus interface 48 to the data control means 60. The device driver 64 polls each preview station interface means 40 approximately every 500 microseconds to exchange data, using an I/O (input/output) address within the data control means 60. The device driver 64 passes the bar code data to the application software 68 running on the data control means 60. The application software 68 then performs a database search against an index of all such bar codes contained within the data control means 60. This data base and its index are created before the application software is executed.

Assuming a match is found in the index, the corresponding database record is retrieved from a master file on the hard drive 70. The record may contain informational data items relating to the video selected by the customer, such as names of the film's stars, directors, producers, musical composers, the name of the production studio, etc. These informational data items may then be transmitted back to the preview station through the chain described above (i.e., from the data control means 60 to the preview station interface means 40 via the data control means interface 48, then to the preview station 20 via the digital interface 44 and the digital interface cable 50). The informational data items may be displayed on the visual display 30 for review by the user. Alternatively, these informational data items, which are retrieved in digital format, may be sent to the video display interface means 82 where they will be formatted and sent to the video display 80 for user viewing.

The file name retrieved from the database record is then used by the data control means 60 to access audio material stored in digital form as a file on the hard drive. This audio material may then be transferred to the preview station in the manner described earlier. Additionally, however, the file name retrieved from the database record is also used by the data control means 60 to access digital video material which is stored on disk drives 70. Blocks of data are read from the hard drive 70, passed through a disk controller and temporarily buffered in RAM. The application software 68 then instructs the device driver 64 to send the digital video material to the video interface means 82.

The microcontroller 84 within the video display interface means 82 stores a predetermined amount of digital audio material in a FIFO buffer, reporting the buffer status (full, half-empty, empty) back to the device driver 64 as needed to retrieve further digital video material. The program directing operation of the microcontroller 84 empties the buffer by sending the digital video material to its digital-to-analog type converter 85, e.g., an MPEG, for conversion to either a European or American format suitable for reading by the video display. The user sees the video signal from the selected video approximately a second or two after scanning the bar code 74.

Numerous samples from each video may be stored on the hard drive(s) in digital form. The video display and/or the visual display 30 may show the sample number that is currently playing, as determined by the application software 68. The user may push a button on the keypad 28 at the preview station 20 to see and hear the next video sample or the previous video sample from the video selection. In addition, the user may press a "volume up" or "volume down" button on the keypad 28 to adjust the volume of the sound or a fast-forward or fast-back video play button to adjust position in the video play back. These keypad 28 depressions are read by the software-controlled microcontroller 26 within the preview station 20 and are passed to the preview station interface means 40, to the device driver 64 and the application software 68 for interpretation, action and responsive outputs consistent with apparatus adjustment keypad inputs.

The customer merely has to scan another video cassette 86 or video disk to start the process over again. With the potential for many preview stations 20 with video displays in a single store location, the apparatus 10 depends on very high-speed processors and data storage. The setup of a four-station apparatus with video displays would require four preview stations 20, two preview station interface means 40 (each capable of handling two preview stations 20), a single video display interface means (each capable of handling four preview stations 20 with video displays 80) and the data control means 60.

The multi-station video/audio distribution apparatus 10 with video displays 80 could be used in any number of applications such as a retail video store, a rental video store, or a retail music store where tracks on a CD are sampled along with a video.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A multi-station video/audio distribution apparatus that allows a plurality of users to simultaneously sample different video material and audio material, comprising:

(a) at least two preview stations, said at least two preview stations each having a user input, an audio output such that an analog audio signal corresponding to said user input may be heard, and a video display such that video material corresponding to said user input may be seen;

(b) data control means, said data control means for retrieving digitized audio and digitized video material corresponding to each of said user inputs;

(c) preview station interface means, said preview station interface means separate from and directly connected to said data control means and said at least two preview stations by non-switched connections not involving a local area network or wide area network, said preview station interface means for transferring each of said user inputs from its respective preview station to said data control means, for receiving each of said digitized audio material corresponding to each of said user inputs, for converting each of said digitized audio materials to said analog audio signal and for transferring each of said analog audio signal to its respective preview station; and (d) video display interface means, said video display interface means separate from and directly connected to said control means and said video display by connections not involving a local area network or wide area network, said video display interface means for receiving each of said digitized video materials corresponding to each of said user inputs, for converting each of said digitized video materials to a format acceptable to said video display, and for transferring said formatted video materials to said video display.

2. The multi-station video/audio distribution apparatus of claim 1, comprising more than two of said preview stations.

3. The multi-station video/audio distribution apparatus of claim 1, comprising a plurality of said preview station interface means and a plurality of said video display interface means.

4. The multi-station video/audio distribution apparatus of claim 1, wherein said at least two preview stations each further comprises a visual display to display informational data corresponding to said user inputs and a keypad to enter apparatus adjustments.

5. The multi-station video/audio distribution apparatus of claim 4, wherein said apparatus adjustments comprise a volume control, fast-forward play, and fast-backward play.

6. The multi-station video/audio distribution apparatus of claim 4, wherein said data control means is further used for retrieving said informational data corresponding to each of said user inputs and for producing responsive outputs consistent with each of said apparatus adjustments and wherein said preview station interface means is further used for transferring said informational data from said data control means to its respective preview station, for transferring said apparatus adjustments from their respective preview station to said data control means and for transferring said responsive outputs from said data control means to their respective preview station.

7. The multi-station video/audio distribution apparatus of claim 1, wherein said data control means is a computer.

8. The multi-station video/audio distribution apparatus of claim 1, wherein said audio output comprises a phono jack connectable to headphones.

9. The multi-station video/audio distribution apparatus of claim 1, wherein said preview station interface means is powered by low-voltage direct current and wherein said preview station interface means is connected to said at least two preview stations by low voltage cables.

10. A multi-station video/audio distribution apparatus that allows a plurality of users to simultaneously sample different video material and audio material comprising:

(a) at least two preview stations, said at least two preview stations each having a bar code scanner to produce a bar code reading, a video display such that video material corresponding to said bar code reading may be seen, an audio output such that an analog audio signal corresponding to said bar code reading may be heard and a keypad to enter apparatus adjustments;

(b) data control means, said data control means for retrieving and transferring digitized audio material corresponding to each of said bar code readings, for retrieving and transferring digitized video material corresponding to each of said bar code readings, and for producing responsive outputs consistent with each of said apparatus adjustments;

(c) low voltage preview station interface means, separate from said at least two preview stations and directly connected to each of said at least two preview stations and to said data control means by non-switched connections not involving a local area network or wide area network, said low voltage preview station interface means for transferring each of said bar code readings from its respective preview station to said data control means, for transferring each of said apparatus adjustments from each of said preview stations to said data control means, for transferring said responsive outputs consistent with each of said apparatus adjustments from said data control means to its respective preview station, for receiving each of said digitized audio material corresponding to each of said bar code readings, for converting each of said digitized audio material to said analog audio signals, and for transferring each of said analog audio signals to its respective preview station; and (d) low voltage video display interface means, separate from said at least two preview stations and directly connected to said video display and to said data control means by non-switched connections not involving a local area network or wide area network, said video display interface means for receiving each of said digitized video material corresponding to each of said bar code readings, for converting each of said digitized video material to a format acceptable to said video display, and for transferring each of said formatted video material to its respective video display.

11. The multi-station video/audio distribution apparatus of claim 10, comprising more than two preview stations.

12. The multi-station video/audio distribution apparatus of claim 10, comprising a plurality of preview station interface means and a plurality of video display interface means.

13. The multi-station audio distribution apparatus of claim 10, wherein said apparatus adjustments comprise a volume control, a fast-forward play, and a fast-backward play.

14. The multi-station audio distribution apparatus of claim 10, wherein said data control means is a computer.

15. The multi-station audio distribution apparatus of claim 10, wherein said audio output comprises a phono jack connectable to headphones.

16. The multi-station audio distribution apparatus of claim 10, wherein said low voltage preview station interface means is connected to said at least two preview stations by low voltage cables.

17. The multi-station video/audio distribution apparatus of claim 10, wherein said low voltage preview station interface means and said low voltage video display interface means are directly connected to said data control means by a computer bus.

18. The multi-station video/audio distribution apparatus of claim 10, wherein said low voltage video display interface means is directly connected to said video display by a cable connection not involving a local area network.

19. The multi-station video/audio distribution apparatus of claim 16, wherein said low voltage preview station interface means is directly connected to said at least two preview stations by low voltage cables not involving a local area network.

20. A multi-station video/audio distribution apparatus that allows a plurality of users to simultaneously sample different video material and audio material, the apparatus comprising:

(a) at least two preview stations, said at least two preview stations each having a bar code scanner to produce a bar code reading, a video display such that video material corresponding to said bar code reading may be seen, an audio output such that an audio signal corresponding to said bar code reading may be heard, and a keypad to enter apparatus adjustments;

(b) a low voltage preview station interface separate from said at least two preview stations and connected by a direct, hard-wired analog interface and a direct, hard-wired digital interface to each of said at least two preview stations, and being adapted to transfer said apparatus adjustments from said at least two preview stations;

(c) a low voltage video display interface separate from said at least two preview stations and connected by a direct, hard-wired video interface to each of said video displays, said video display interface further comprising a video microcontroller under program control having random access memory and read only memory and further comprising an analog-to-digital converter adapted to decompress and convert digitized video material to formatted video material for display on said video displays; and (d) a data control means directly connected to said preview station interface and to said video display interface, said data control means for retrieving and transferring to said preview station interface digitized audio material corresponding to each of said bar code readings, for retrieving and transferring to said video display interface digitized video material corresponding to each of said bar code readings, and for producing responsive outputs consistent with each of said apparatus adjustments received from said preview station interface.

21. The multi-station video/audio distribution apparatus of claim 20, wherein said video display interface further comprises a circuit board powered by low voltage direct current and further comprising four ports, each port being connectable to one of said video displays.

22. The multi-station video/audio distribution apparatus of claim 21, wherein said video display interface is connected to said data control means via a computer bus.

23. The multi-station video/audio distribution apparatus of claim 20, comprising more than two preview stations.

24. The multi-station video/audio distribution apparatus of claim 20, comprising a plurality of preview station interface means and a plurality of video display interface means.

25. The multi-station video/audio distribution apparatus of claim 20, wherein said direct, hard-wired digital interface, said direct, hard-wired analog interface, and said direct, hard-wired video interface are direct cable connections not involving a local area network.

* * * * *